April 6, 1943.   C. H. HAPGOOD   2,316,065
COW MILKING APPARATUS
Filed Feb. 10, 1940   2 Sheets-Sheet 1
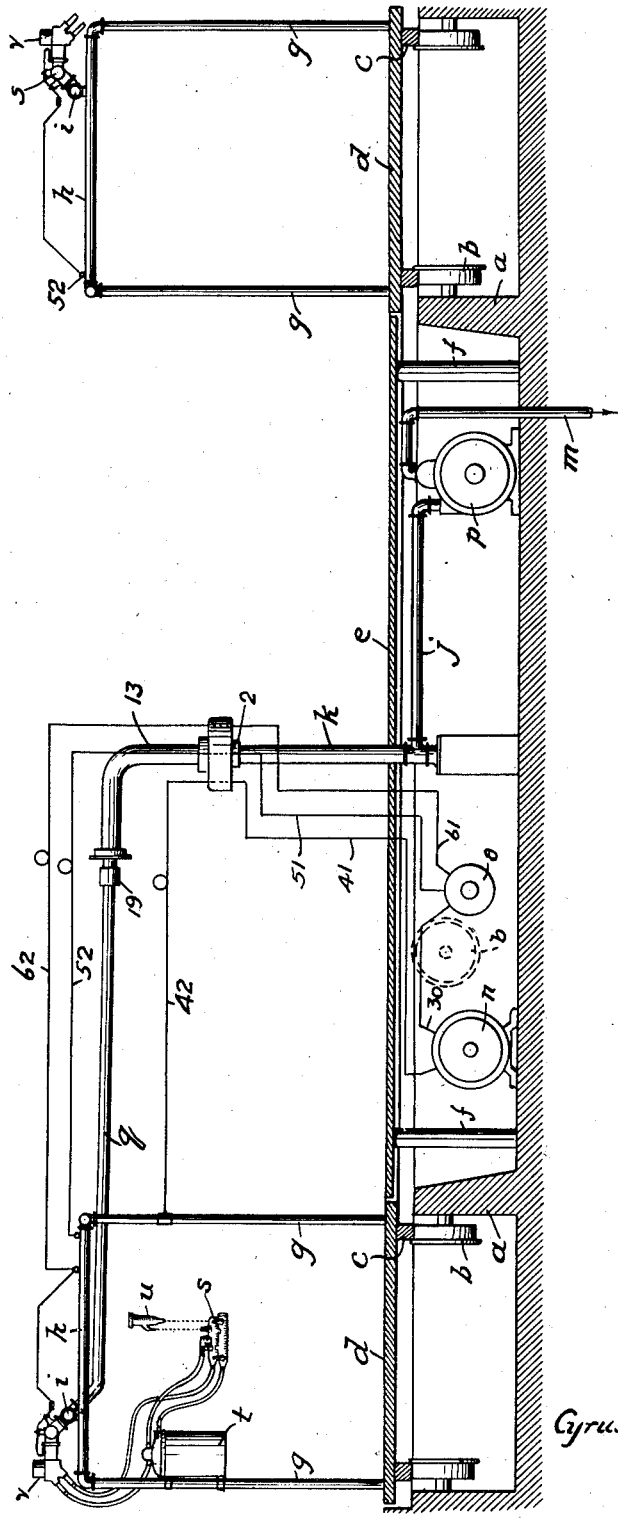
FIG. I.
WITNESS:
Rob R Mitchell
INVENTOR
Cyrus Howard Hapgood
BY
Busser and Harding
ATTORNEYS.

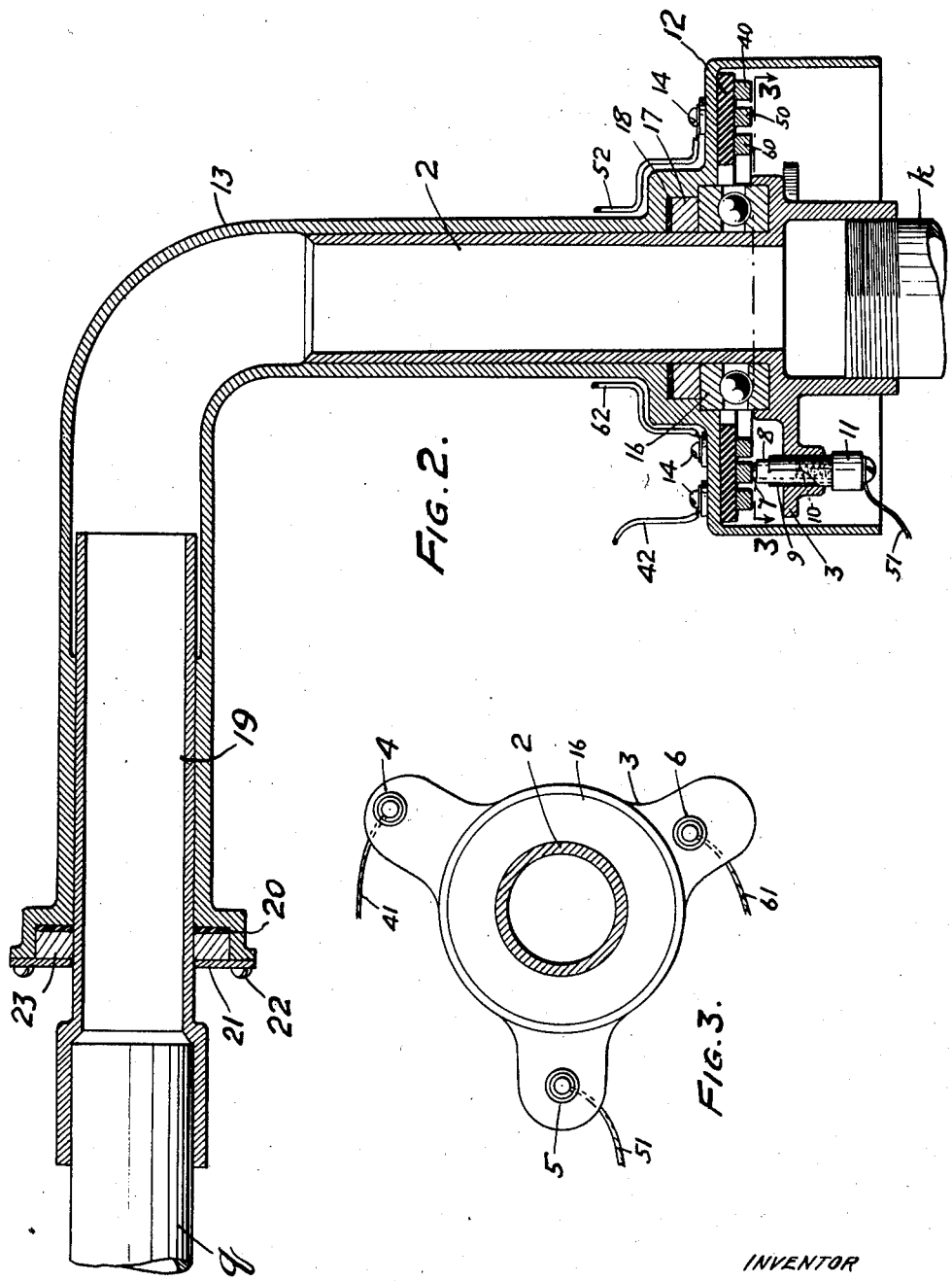

Patented Apr. 6, 1943

2,316,065

UNITED STATES PATENT OFFICE 2,316,065

COW MILKING APPARATUS

Cyrus Howard Hapgood, Nutley, N. J., assignor to The De Laval Separator Company, New York, N. Y., a corporation of New Jersey Application February 10, 1940, Serial No. 318,211

7 Claims. (Cl. 31—58)

In a patent issued to me December 30, 1930, No. 1,787,152, I disclose a cow-milking apparatus comprising a rotatable annular table or platform onto which, during its rotation, the cows walk one by one and are successively milked, the cows thereafter leaving the table, one by one, as the table continues to rotate. This milking machinery comprised a number of spaced apart pneumatically actuated milking units carried by, and arranged around the periphery of, the table. It also included a vacuum pipe extending circumferentially around the rotary table, this pipe having branch connections to the various milking units. The vacuum pipe was connected to a vacuum pump, which was driven by a motor. The motor and pump were all carried on the under side of the rotary table. The apparatus also included fixed devices which, as the milking units rotated with the platform, successively cooperated with such units and rendered them successively operative.

This apparatus has been improved from time to time and a number of patents, embodying certain of such improvements, have issued to me, namely: No. 1,959,716, May 22, 1934; No. 1,987,955, January 15, 1935; and No. 2,059,340, November 3, 1936.

In a later construction, commercially operated prior to the conception and reduction to practice of the present invention, the teat cup pulsations were controlled by magnetic pulsators, one for each unit, which were actuated from a generator electrically connected with the units by means of a conductor extending around the rotary table. The generator, like the vacuum pump, was carried on the underside of the rotary table.

Both the original machine and the later improved machine had certain disadvantages some of which were obvious from the beginning and others of which developed in actual use. These disadvantages may be summarized as follows:

1. It is costly to hang the vacuum pumps with auxiliary equipment on the under side of the rotary table.

2. The installation requires a much larger pit under the rotary table than would be otherwise required.

3. To get the electric current to this equipment it is necessary to run trolley wires completely around the under side of the table with stationary trolleys contacting the wires.

4. The exhaust of the vacuum pumps contains some oil vapor and it is necessary to discharge this into the pit, the surfaces of which soon become coated with a film of oil.

The present invention has for its object to eliminate these disadvantages. The vacuum pump, generator and driving motor are all mounted on a stationary base and pneumatic and electric connections are provided therefrom to the milking machine units. Such an arrangement involved the necessity of designing entirely new connections between the pump and generator and the pneumatically and electrically operating elements of the milking units. The problem of providing these connections was rendered somewhat more difficult by the necessity of providing connections which would be reliably operative notwithstanding deviation of the rotary annular table from its supposed center of rotation.

The accompanying drawings illustrate such part of the complete milking apparatus as is necessary to clearly disclose the invention.

Fig. 1 is a vertical sectional view through the center of the cow milking apparatus.

Fig. 2 is a vertical sectional view showing in detail the means, interposed between the stationary vacuum pump, generator and distributor and the rotary milking units for connecting stationary and rotary pneumatic and electric elements.

Fig. 3 is a horizontal section on the line 3—3 of Fig. 2.

A concrete foundation with piers $a$ supports rotary flanged wheels $b$, which support rails $c$ secured to the underside of a rotary table or platform $d$. Surrounded by rotary table $d$ is a stationary platform $e$ supported by posts $f$. Two diametrically opposite wheels $b$ are motor driven to rotate the table $d$.

Radial stalls formed by posts $g$, $g$, carried by the table and connected by top radial bars $h$ hold the cows while they are being washed and milked. The top radial members $h$ carry a circumferentially extending main vacuum pipe $i$ corresponding to the vacuum pipe $p$ of Patent No. 1,787,152 and vacuum pipe 50 of Patent No. 1,959,716. Vacuum pipe $i$ is connected, through magnetic pulsators $v$, with milking machine units, each comprising a milk pail $t$, a set of teat cups $u$, and a pneumatic pulsator $s$, as shown, for example, in Patent No. 1,911,618 issued to me May 30, 1933. The specific means for automatically controlling the successive operation of these units need not be herein described, as they are fully disclosed in the patents mentioned and form no part of the present invention.

At the center of the apparatus, below the stationary platform $e$, is a stationary vertical pipe $k$ plugged below its connection with a stationary pipe $j$, which is connected with the inlet of a stationary vacuum pump $p$, which exhausts through a pipe $m$ to the atmosphere. Interposed in pipe $j$ are a liquid separator, a vacuum controller and a sanitary trap, but these are not illustrated, since they form no part of the invention.

Below the platform $e$ are also located a stationary low voltage electric generator $n$ and a stationary distributor $o$, the electric connections to which are hereinafter described. Distributor $o$ may be in geared connection with the shaft of pump $p$, but this connection is not described, since the means for driving the pump and distributor forms no part of the present invention.

Referring now to Figs. 2 and 3: Threaded onto the upper end of vacuum pipe $k$ is a vertical pipe or internal sleeve 2. Like the pipe $k$ it is central or respect to the rotary annular table $d$ and connects with the vacuum pump $p$ through pipes $k$ and $j$.

Sleeve 2 has a flange 3 which carries three brush holders 4, 5 and 6, which contact, respectively, with three slip rings 40, 50 and 60. Each brush holder is of standard commercial type in which a carbon brush 7 is capable of sliding in a metal cylinder 8, which is insulated from the flange 3 by an insulating sleeve 9. In each cylinder 8 is a compression spring 10, one end of which presses against the brush 7 and the other end against a cap 11 which is threaded to the end of cylinder 9.

Slip rings 40, 50 and 60 are carried by an annular plate 12 of insulating material, which is fastened to the enlarged lower end of an elbow pipe 13, the vertically extending section of which is sleeved on the sleeve 2. Three insulated screws 14 connect the three slip rings with three lead wires hereinafter described.

The elbow 13 has a rotating fit on sleeve 2 and is carried thereon by a ball thrust bearing 16. The junction between sleeve 2 and elbow 13 is made air-tight by a standard commercial seal 17, which is backed by a rubber washer 18.

At the end of the horizontally or radially extending section of elbow 13 is a slidable internal sleeve 19, which is sealed at the junction between the two by a seal 23 backed by a rubber washer 20. This is held in place by a plate 21, which is secured to elbow 13 by screws 22. By this means sleeve 19 can slide in elbow 13 without pneumatic leak.

Connected with the circumferentially extending vacuum pipe $i$ (see Fig. 1) in any convenient way, as, for example, by a T in the pipe $i$, is a slightly inclined radially extending vacuum pipe $q$, the inner end of which is secured to the outer end of the sleeve 19.

The low voltage electric generator $n$ is provided with terminals one of which, by wire 41, connects with brush holder 4 and then, through slip ring 40 and the corresponding screw 14, to a conductor 42, which is supported by pipe $q$ and is grounded on one of the posts $g$. In Fig. 2, conductor 42, as well as the hereinafter specified conductors 52 and 62, is, for purposes of clearness, shown unsupported.

The other terminal of generator $n$ connects, by wire 30, with the distributor $o$, which has a shaft in geared connection (not shown) with the shaft of pump $p$. Distributor $o$ connects wire 30 alternately with conductors 51 and 61 and thence, through slip rings 50 and 60 respectively, to conductors 52 and 62 respectively, which are supported by pipe $q$.

Conductor 52 extends half way around the rotary table $d$ in clockwise direction and is electrically connected to the magnetic pulsators $v$ of one half of the milking machine units. While the detailed construction of the magnetic pulsator is no part of the invention, its preferable construction is that disclosed in the hereinbefore mentioned Patent No. 1,911,618.

Conductor 62 extends half way around the rotary table $d$ in counter-clockwise direction and is electrically connected to the magnetic pulsators $v$ of the other half of the milking machine units.

By the arrangement just described, pulsating electric currents are transmitted to the two sets of magnetic pulsators in such manner as to impose a practically constant load on the generator $n$.

The wires 42, 52 and 62 are looped to insure flexibility at the sliding joint.

By the described arrangement, vacuum and pulsating currents are transmitted to all the milking machine units even though the rotary table may not run precisely concentric to its supposed center of rotation.

The improved milking apparatus has none of the disadvantages characterizing those which preceded my invention. The cost of installation is moderate. A small pit under the rotary table suffices. The pump exhaust may be run to the outside of the building. The operativeness and commercial utility of the apparatus were demonstrated by its continuous successful use throughout the 1939 season of the New York World's Fair.

What I claim and desire to protect by Letters Patent is:

1. A cow milking apparatus comprising a rotary table adapted to carry cows to be successively milked, milking machine units arranged around and rotatable with the table, means providing a vacuum passage carried by and rotatable with the table and pneumatically connectable with said milking machine units, a stationary vacuum pump, a stationary vacuum conduit connected with said pump and a rotary vacuum conduit connected with said stationary conduit and said rotary pneumatic passage, said rotary conduit comprising a pipe turnable on the stationary conduit and a pipe connected to the rotary pneumatic passage and which is slidably connected to said turnable pipe.

2. A cow milking apparatus comprising a rotary table adapted to carry cows to be successively milked, milking machine units arranged around and rotatable with the table, means providing a vacuum passage carried by and rotatable with the table and pneumatically connectable with said milking machine units, a stationary vacuum pump, a stationary vacuum conduit extending upward from said pump, an elbow pipe having a section rotatable about said stationary conduit and a section extending outward from the first named section and another pipe rotatable with the table and pneumatically connected with said rotary pneumatic passage and slidably connected with the last named section of the elbow pipe.

3. A cow milking apparatus comprising a rotary table adapted to carry cows to be successively milked, milking machine units, including electrically controlled pulsators, arranged around and rotatable with the table, a stationary electric generator, a stationary electric distributor in electrical connection with said generator, electric connections from the distributor which, in the rotation of the distributor are alternately connected with the generator, two stationary electric current transmitting elements respectively connected with said electric connections from the distributor, two rotatable electric current transmitting elements contacting respectively with said two stationary elements, electric conductors extending around, and through different arcs of, and rotatable with, said rotary table and connected with different sets of electrically controlled pulsators, and electric connections between said rotary current-transmitting elements and said respective electric conductors.

4. A cow milking apparatus comprising a rotary table adapted to carry cows to be successively milked, milking machine units, including electrically controlled pulsators, arranged around and rotatable with the table, a stationary electric generator and terminals therefrom, a stationary electric distributor in electric connection with one of said terminals, electric connections from the distributor which, in the rotation of the distributor, are alternately connected with the last named terminal of the generator, three stationary electric current transmitting elements, two of which are respectively connected with said electric connections from the distributor and the third of which is in electric connection with the other of said terminals, three rotatable electric current-transmitting elements contacting respectively with said stationary elements, electric conductors extending around, and through different arcs of, and rotatable with, said table and connected with different sets of electrically controlled pulsators, electric connections between two of said rotary current-transmitting elements and said electric conductors respectively, and a grounded electric connection from the other of said rotary current transmitting elements.

5. A cow milking apparatus comprising a rotary table adapted to carry cows to be successively milked, milking machine units, including electrically controlled pulsators, arranged around and rotatable with the table, means providing a vacuum passage carried by and rotatable with the table and pneumatically connectable with said milking machine units, electric conducting means extending around and rotatable with the table and connected with said electrically controlled pulsators, a stationary vacuum pump, a stationary generator, a vertical stationary vacuum conduit connected with said pump and located at approximately the center of rotation of the table, an elbow pipe having a downwardly extending section in sleeved relation with and turnable on said stationary vacuum conduit and an outwardly extending section, a radially extending pipe pneumatically connected and rotatable with said rotary vacuum passage and in sleeved relation with the outwardly extending section of the elbow pipe, a stationary brush electrically connected with one terminal of said generator, a ring carried by and rotatable with the downwardly extending section of said elbow pipe and in its rotation contacting with said brush, an electrical connection between said ring and said electric conducting means and electric connections between said rotatable electric conducting means and the other terminal of the generator.

6. A cow milking apparatus comprising a rotary table adapted to carry cows to be successively milked, milking machine units, including electrically controlled pulsators, arranged around and rotatable with the table, means providing a vacuum passage carried by and rotatable with the table and pneumatically connectable with said milking machine units, electrical conducting means extending around and rotatable with the table and connected with said electrically controlled pulsators, a stationary vacuum pump, a stationary generator, a stationary vacuum conduit connected with said pump, a rotary vacuum conduit sleeved on the stationary vacuum conduit and connected with said rotary vacuum passage, a flange extending radially from the stationary vacuum conduit, a brush carried by and extending upward from said flange and electrically connected with one terminal of the generator, an enlarged head on the lower end of the rotary vacuum conduit, a ring carried by said head and extending above and contacting with said brush and electrically connected with said rotatable electric conducting means and electric connections between said rotatable electric conducting means and the other terminal of the generator.

7. A cow milking apparatus comprising a rotary table adapted to carry cows to be successively milked, milking machine units, including electrically controlled pulsators, arranged around and rotatable with the table, means providing a vacuum passage carried by and rigid with and rotatable with the table and pneumatically connectable with said milking machine units, electrical conducting means extending around and rotatable with the table and connected with said electrically controlled pulsators, a stationary vacuum pump, a stationary generator, an upwardly extending stationary vacuum conduit connected with said pump and located at approximately the center of rotation of the table, a rotary vacuum conduit having a downwardly extending section rotatable about said stationary conduit, means connecting said rotary vacuum conduit with said stationary vacuum conduit, said means including an element movable relatively to one of the conduits to compensate for any running of the rotary table not precisely concentric to the designed center of rotation, electric current transmitting elements one of which is carried by the upwardly extending stationary vacuum conduit and connected with one terminal of said generator and the other of which is carried by the downwardly extending section of the rotary vacuum conduit and is electrically connected with said rotatable electric conducting means and electric connections between said rotatable electric conducting means and the other terminal of the generator.

CYRUS HOWARD HAPGOOD.